(No Model.) 2 Sheets—Sheet 2.
G. B. DURKEE.
SAFETY BICYCLE.
No. 439,128. Patented Oct. 28, 1890.
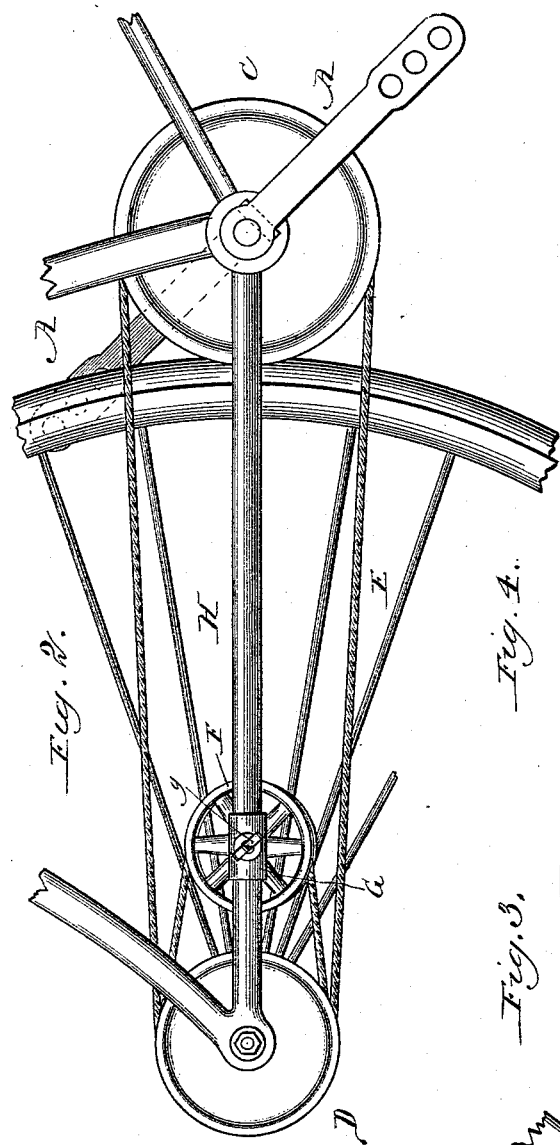
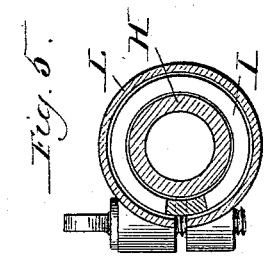
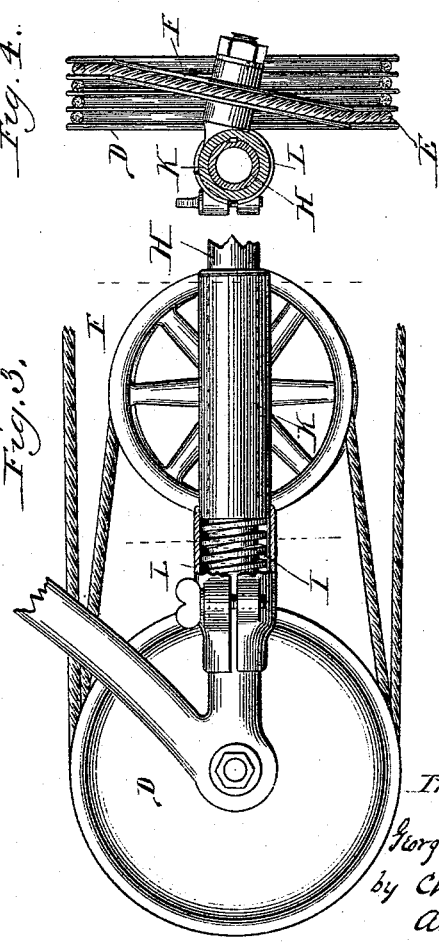
Witnesses
W. Rossiter
Fred'k H. Mills
Inventor
George B. Durkee
by Chas. G. Page
Attorney.

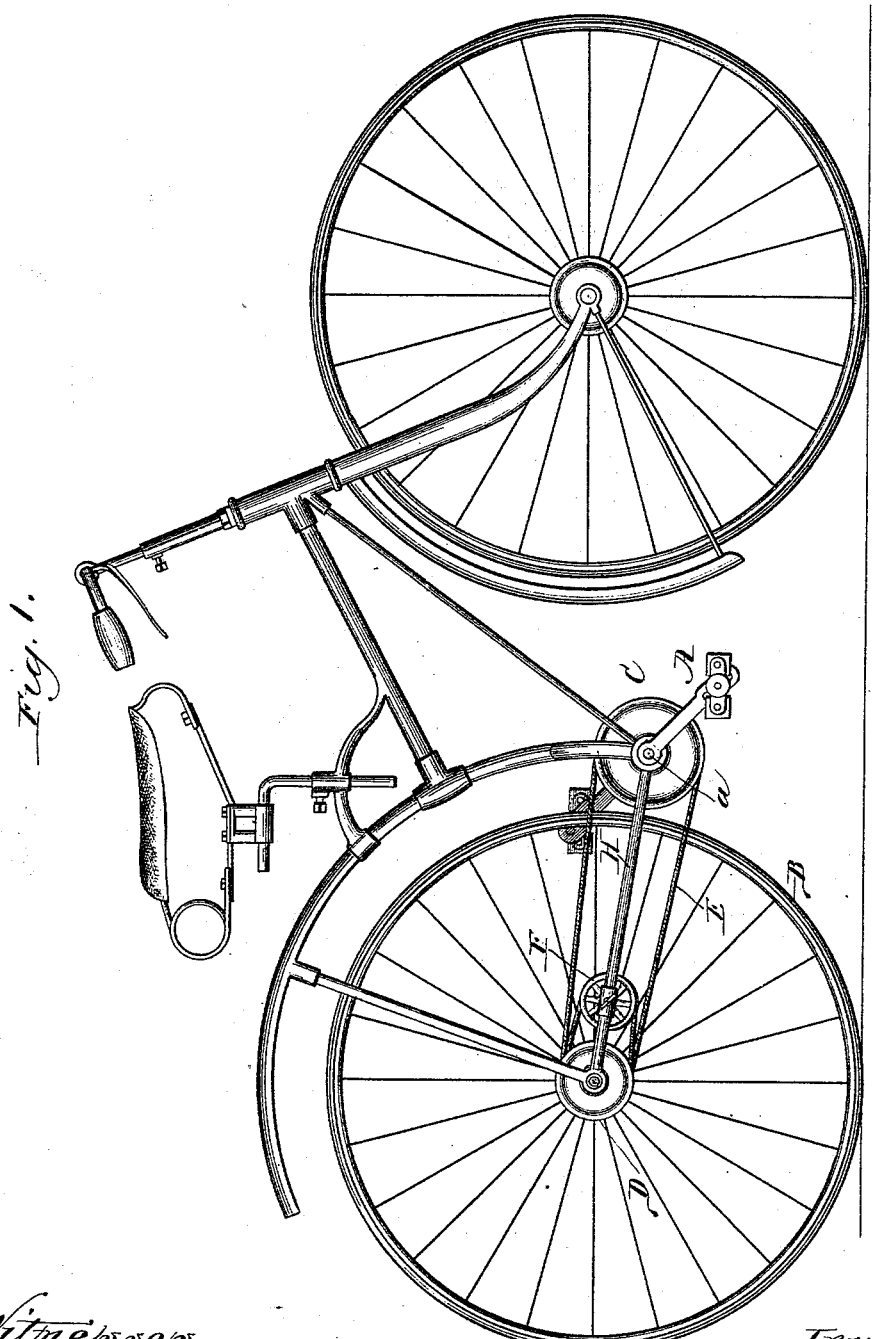

UNITED STATES PATENT OFFICE.

GEORGE B. DURKEE, OF CHICAGO, ILLINOIS.

SAFETY BICYCLE.

SPECIFICATION forming part of Letters Patent No. 439,128, dated October 28, 1890.

Application filed August 13, 1889. Serial No. 320,639. (No model.)

*To all whom it may concern:*

Be it known that I, GEORGE B. DURKEE, a citizen of the United States, residing at Chicago, in the county of Cook and State of Illinois, have invented a certain new and useful Improvement in Velocipedes, of which the following is a specification.

My invention relates more particularly to velocipedes of the class known as "Safety bicycles," and is directed to the improvement of means employed for transmitting power from the foot-movement to the driving-wheel.

The object of my invention, generally stated, is to provide a bicycle with a practically better and more complete power-transmitting system for the aforesaid purpose, certain objects, more particularly stated, being to avoid noise and rattle, to provide light and reliable means for the aforesaid purpose, to avoid loose motion in the crank-shaft, to preserve a uniform distance between the crank-shaft and the driving-wheel, and to provide certain details serving to increase the general efficiency of the machine.

To the attainment of the foregoing and other useful ends my invention consists in matters hereinafter set forth, and particularly pointed out in the claims.

In the accompanying drawings, Figure 1 represents in side elevation a Safety bicycle involving the leading principles of my invention. Fig. 2 represents in elevation on a larger scale the power-transmitting device. Fig. 3 shows on a still larger scale a portion of Fig. 2, with a part of the box or sleeve L broken away for convenience of illustration. Fig. 4 is a section on line 4 4 in Fig. 3, looking toward the tightener-sheave F, and showing said sheave and also the pulley D in elevation. Fig. 5 is a section on line 5 5 in Fig. 3, but on a larger scale.

The foot-movement in the bicycle herein shown involves the pedal-cranks A, which are attached to a crank-shaft $a$, as usual. The foot movement is connected with the rear driving-wheel B through the medium of a cord-and-pulley system of power transmission. Said system of transmission comprises a multiple grooved pulley C, which is applied to the foot-movement, a multiple grooved pulley D, which is applied to the driving-wheel, an endless strand or cord E, arranged to pass a plurality of times between and about said two pulleys, and an adjustable tightener-sheave F, which is arranged to take up slack in the cord. The pulley C is herein secured to the crank-axle, and the pulley D is rigid with the driving-wheel. These pulleys are each provided with a plurality of grooves, so that the cord can be passed around and carried back and forth between these two pulleys a number of times for obvious reasons. The cord may, however, and herein does, pass but once about the tightening-sheave, and is herein shown as taken from the pulley D, (which may be termed the "driving-wheel pulley,") so as to carry it about the tightening-sheave.

To a better understanding of the disposition of the cord, it may be observed that if, for example, the pulley C has three grooves, so that the cord will pass three times about it, then the pulley D should have four grooves, so that the cord may pass four times about it, the cord being transferred from the groove at one end of said pulley D to the groove at the opposite end thereof by means of the tightener-sheave, as illustrated in Fig. 4, wherein the tightener-sheave is arranged at an angle suitable for such purpose. I do not, however, limit myself to the number of grooves in the pulleys, since they may be so grooved as to permit the cord to pass about them any desired number of times. The pulleys which I thus employ in a bicycle are necessarily small, and hence I make the cord small but exceedingly strong. For this purpose any suitable material can be used in the manufacture of the cord, although linen or silk will be found preferable to leather or rawhide, since a cord so made can be more readily spliced. A cord made from metal could, however, be employed.

The tightener-sheave F is adjustably held upon a portion of the main frame of the bicycle and can be arranged either for automatic or hand adjustment.

In Figs. 1 and 2 the bearing for the tightener-sheave is adjustably held upon a rod H, that forms a part of the bicycle-frame, in which case the said bearing is provided with a sleeve G, which can be arranged to slide upon and be held in adjustment upon the frame-rod H by a set-screw $g$.

In Figs. 3, 4, and 5 the bearing for the tightener-sheave is self-adjustable upon the frame-rod H and subject to a spring I, which is arranged to so act against the bearing as to hold the cord taut. In said last three figures the bearing is provided with a sleeve K, which slides upon the frame-rod and abuts against the spring I. The sleeve K is feathered upon the rod, so as to slide longitudinally but not turn thereon, and the spring which is arranged upon the frame-rod is confined within a box or sleeve L, that is adjustably held upon the frame-rod, by which arrangement the spring can at one end abut against a shoulder in the box and at its opposite end abut against the sleeve K. The sleeve L is conveniently formed of a split shell provided with a set-screw M for tightening it upon the frame-rod, by which arrangement the box can be adjusted for the purpose of adjusting the spring. The tendency of the spring is to force the sleeve K in a direction to keep the tightener-sheave away from the driving-wheel pulley, and thereby keep the cord taut. Any inequality in the splicing or slight stretching in the cord will therefore be compensated by the spring, and hence the cord will run easy and have its lifetime greatly prolonged.

The sleeve K is provided with a stud $k$, about which the sheave is arranged to turn. It is understood that the sleeve G in Figs. 1 and 2 is likewise provided with a stud for the sheave. In both instances, however, the tightener-sheave should run on roller or ball bearings.

For the broader purpose of my invention the tightener-sheave can be held upon any suitable portion of the machine, the particular arrangement herein shown being, however, a feature of improvement.

For the broader purpose of my invention I may employ an adjustable bearing for the tightener-sheave, whether such bearing be self-adjustable or otherwise; but, as a matter of preferred and special improvement, I desire to also cover a spring-adjustable bearing for the tightener-sheave.

It is also understood that my invention can be applied to other velocipedes—such as tandems, tricycles, quadricycles, and the like—and that its application to such can be made without the exercise of further invention.

What I claim as my invention is—

1. The combination, substantially as hereinbefore set forth, of the crank-axle of a velocipede and foot-treadles for operating the same, a multiple-grooved pulley C, secured upon the crank-axle, a multiple-grooved pulley D, rigid with one of the running-wheels of the machine, the small endless cord E, carried back and forth between and about the multiple-grooved pulleys a number of times corresponding with their grooves, and a tightener-sheave F, adjustably held upon the frame of the velocipede and taking a turn of the cord from one of the multiple-grooved pulleys.

2. The combination, substantially as hereinbefore set forth, of the crank-axle of a velocipede and foot-treadles for operating the same, a multiple-grooved pulley C, secured upon the crank-axle, a multiple-grooved pulley D, rigid with one of the running-wheels of the machine, the small endless cord E, carried back and forth between and about the multiple-grooved pulleys a number of times corresponding with their grooves, and a tightener-sheave F, taking a turn of the cord from one of the muliple-grooved pulleys, said sheave being held by a bearing arranged to slide on the frame of the velocipede and subject to a spring which acts to keep the cord taut.

3. The combination, substantially as hereinbefore set forth, in a velocipede, of the crank-axle and foot-treadles for operating the same, the multiple-grooved pulley C, fixed upon the crank-axle, the multiple-grooved pulley D, rigid with one of the running wheels, the tightener-sheave F, journaled in a bearing which is adjustably arranged upon the rod H of the velocipede-frame, and the small endless cord E, passing about the multiple-grooved pulleys a number of times corresponding with their grooves and also taking a turn about the tightener-sheave.

GEORGE B. DURKEE.

Witnesses:
CHAS. G. PAGE,
A. COATES.